L. G. SIERCKS.
SLED TRACK.
APPLICATION FILED FEB. 1, 1921.
1,377,445.  Patented May 10, 1921.
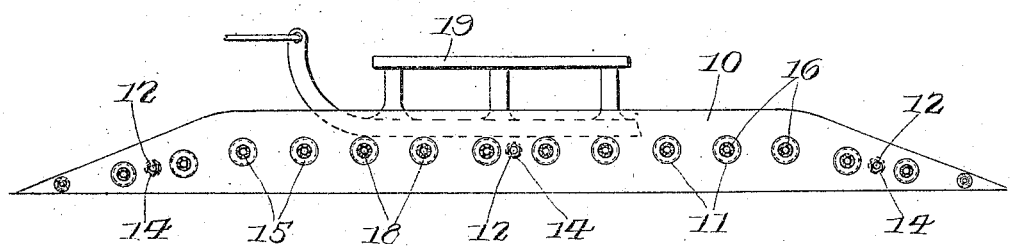
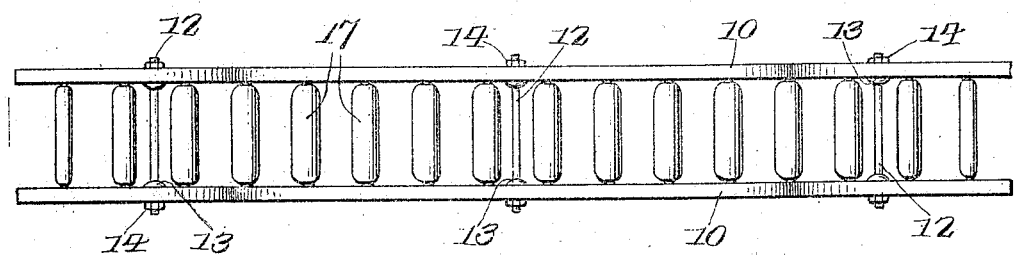
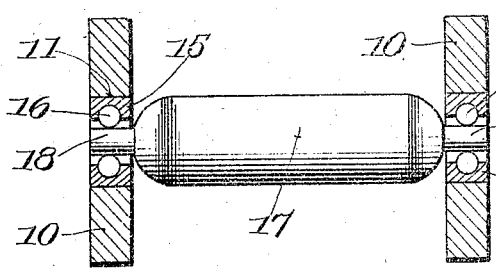
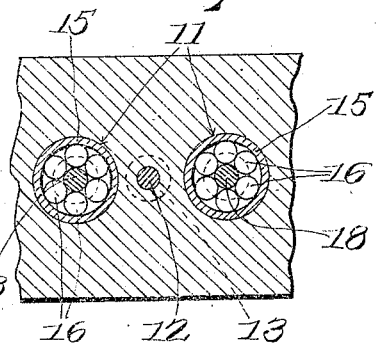
Witness.
James F. FitzGibbon
Inventor
Leo G. Siercks.
By Chudlee & Chudlee
Attorney

UNITED STATES PATENT OFFICE.

LEO G. SIERCKS, OF WAYNE, NEBRASKA.

SLED-TRACK.

1,377,445.   Specification of Letters Patent.   Patented May 10, 1921.

Application filed February 1, 1921. Serial No. 441,629.

*To all whom it may concern:*

Be it known that I, LEO G. SIERCKS, a citizen of the United States, residing at Wayne, in the county of Wayne, State of Nebraska, have invented certain new and useful Improvements in Sled-Tracks; and I do hereby declare the following to be a full, clear, and exact description of the invention, such as will enable others skilled in the art to which it appertains, to make and use the same.

This invention relates to new and useful improvements in trackways and particularly to trackways used in connection with sleds.

One object of the invention is to provide a trackway which is especially adapted for use in barns or other outbuildings, to facilitate the bringing into the barns of loads of material for storage, which are contained on sleds.

Another object resides in the novel and improved manner in which the rollers of the trackway are mounted in the side members thereof.

Other objects and advantages will be apparent from the following description when taken in connection with the accompanying drawing.

In the drawing:

Figure 1 is a side elevation of a trackway made in accordance with the invention.

Fig. 2 is a top plan view of the trackway.

Fig. 3 is a vertical transverse section on the line 3—3 of Fig. 2.

Fig. 4 is a vertical longitudinal central sectional view through one of the side members of the trackway, on the line 4—4 of Fig. 2.

Referring particularly to the accompanying drawing, 10 represents a pair of longitudinally extending and parallel side members, the opposite ends of each of which are inclined downwardly toward the floor on which the members are placed. In each of the members 10 there are formed the longitudinal series of regularly spaced openings 11, those of one member being in transverse alinement with those of the other side member. Transversely extending bars or rods 12 have their opposite ends disposed through the side members and each is formed with the stop shoulders, 13 bearing against the inner faces of the side members, and the nuts 14, engaged on their ends, which bear against the outer faces of the members, to hold the members in properly spaced parallel relation.

The surrounding wall of each of the openings 11 is formed with a channel 15 in which are arranged the series of bearing balls 16. Extending transversely between the side members 10 are the longitudinal series of rollers 17, the pintles or trunnions 18 of which are disposed through the alined openings of the members and centrally of the series of bearing balls.

By this construction the rollers 17 will rotate very freely, whereby the runners of the sled 19 will readily slide thereover.

The trackway is especially useful in a barn where a load of grain is brought thereinto on a sled, or bob sled. Ordinarily, this sled must be dragged along the floor of the barn by the animals pulling the same. As this is a tedious task, the animals sometimes slip and fall, with the result that they sustain broken legs, or other serious injuries. By reason of the fact that the ends of the side members are inclined, the sled will be more easily drawn up onto the rollers, and without jar or jerk.

What is claimed is:

A trackway comprising a pair of side members each having its opposite ends inclined downwardly and formed with a longitudinal series of openings, the surrounding wall of each opening being formed with a bearing ball receiving channel, the openings of one member alining with the openings of the other member, bracing and spacing rods extending between and connected to the side members, and transverse rollers extending between the side members and each having trunnions on its opposite ends rotatable within series of bearing balls of alined openings.

In testimony whereof, I affix my signature, in the presence of two witnesses.

LEO G. SIERCKS.

Witnesses:
JOHN JENIK, Jr.,
NINA THOMPSON.